(No Model.)

G. ASHBY.
DRIP CUP.

No. 335,007. Patented Jan. 26, 1886.

WITNESSES
F. L. Ourand
C. W. Johnson

George Ashby
INVENTOR

Attorney

UNITED STATES PATENT OFFICE.

GEORGE ASHBY, OF HARRISON, OHIO.

DRIP-CUP.

SPECIFICATION forming part of Letters Patent No. 335,007, dated January 26, 1886.

Application filed January 22, 1885. Serial No. 153,668. (No model.)

*To all whom it may concern:*

Be it known that I, GEORGE ASHBY, a citizen of the United States of America, residing at Harrison, in the county of Hamilton and State of Ohio, have invented certain new and useful Improvements in Drip-Cups for Umbrellas; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to drip-cups for umbrellas; and it consists in the improvements hereinafter set forth and explained.

Figure 1:
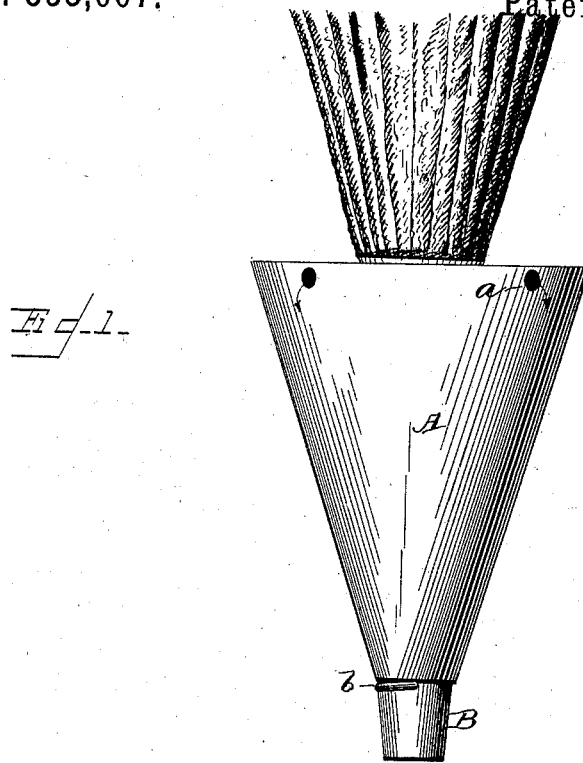
Figure 2:
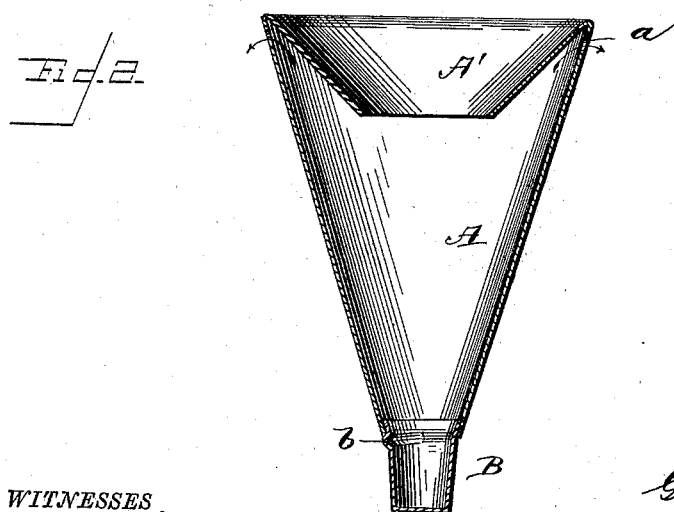

In the accompanying drawings, which illustrate my invention, Figure 1 is a side view. Fig. 2 is a sectional view.

A represents an outer conical cup or receptacle, the upper part of which is upset and turned inwardly, so as to form an inner conical cup, A'. These cups are preferably formed of a single piece of sheet metal.

B represents a ferrule which is attached to the lower end of the outer cone, the upper edge of said ferrule being flanged, while immediately below said flanged portion this ferrule is upset, so as to provide a screw-thread, $b$, which partially encircles said ferrule. The ferrule B may be open at its lower end, instead of closed, as shown in Fig. 2. The upper portion of the cone A is provided with perforations $a$, which are located near the upper edge of the same.

To attach the improved drip-cup herein described to the stick of the umbrella, the same is inserted through the opening in the conical cup A', so that the end of the stick will enter the ferrule B. The drip-cup is then given a partial turn, and the screw-thread coming in contact with the stick of the umbrella will hold the parts firmly one upon the other. The openings $a$ are for the purpose of allowing the water to escape from the cup A when the same is reversed.

I claim—

A drip-cup for umbrellas composed of two conical sections formed integral with each other, the outer section being provided at its upper portion with openings $a$, designed to discharge drip-water from the side of the drip-cup, in combination with a ferrule, B, having a screw-thread, $b$, formed thereon, substantially as set forth.

In testimony whereof I affix my signature in presence of two witnesses.

GEORGE ASHBY.

Witnesses:
P. W. FRANCIS,
JOSEPH G. FRANCIS.